March 21, 1961     J. H. HALSTEAD     2,975,867
AUTOMOTIVE VEHICLE LIFT
Filed May 26, 1958     2 Sheets-Sheet 1
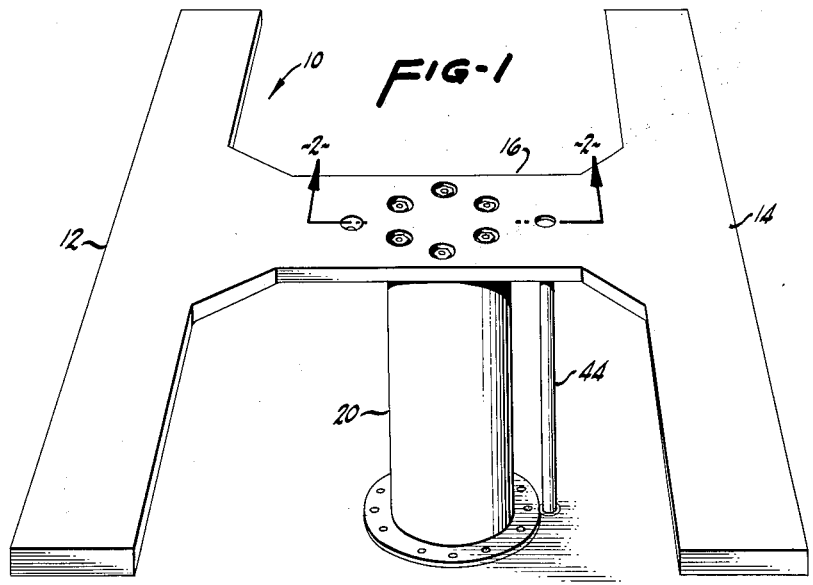
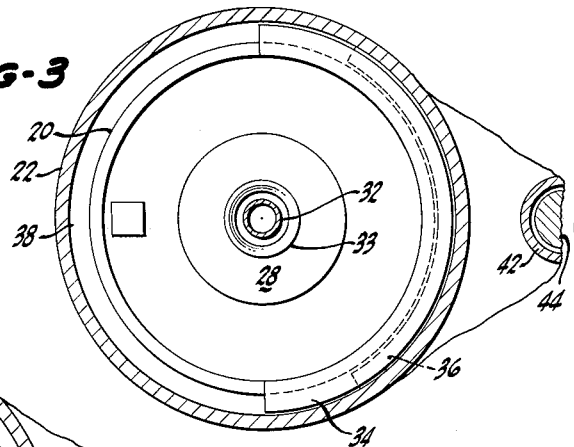
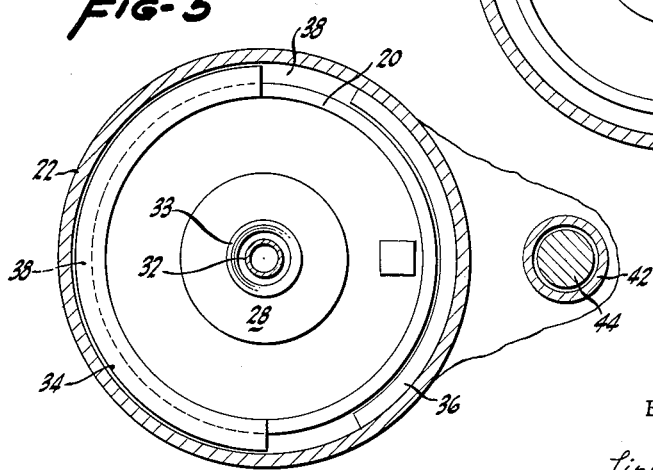
INVENTOR.
JOHN H. HALSTEAD
BY
Lippincott, Smith & Ralls
ATTORNEYS INVENTOR.
JOHN J. HALSTEAD
BY
Lippincott, Smith & Ralls
ATTORNEYS

United States Patent Office 2,975,867
Patented Mar. 21, 1961

2,975,867

AUTOMOTIVE VEHICLE LIFT

John H. Halstead, 1024 Emory St., San Jose, Calif.

Filed May 26, 1958, Ser. No. 737,750

8 Claims. (Cl. 187—8.41)

This invention relates to hydraulic or pneumatic lifts for automotive vehicles, and more particularly to adjustable-stroke, cylinder-and-piston assemblies for such lifts.

Generally, two types of lifts for raising automotive vehicles above the ground or floor level are available: The first type raises a vehicle by its wheels after the vehicle has been driven onto spaced, parallel side rails of the superstructure of the lift; and the second type raises the vehicle by an engagement of the parallel side rails of the superstructure with the frame of the vehicle after the vehicle has been driven over the superstructure so that the vehicle wheels are on opposite sides of the superstructure. The first type is commonly referred to as the "drive-on" type lift, while the second is sometimes referred to as the "frame-lift" type.

The advantage of one type of lift over the other depends upon the operations to be performed on the vehicle to be lifted and the type of vehicle or vehicles most frequently to be accommodated by the lift. When the "drive-on" type of lift is employed, it is apparent that the superstructure of the lift will first engage the vehicle wheels substantially at the ground level, due to the fact that the vehicle must be driven onto the superstructure of the lift so that all of its wheels are supported upon the rails of the superstructure. Where the "frame-lift" type is used, the superstructure must first travel a short distance upwardly before it will engage the frame of the vehicle to be lifted. Thus, the length of the piston stroke of the lift in the two cases will be different in order to raise a vehicle to the same height above the ground level. To raise a vehicle to a given height above the ground level, the "drive-on" lift will require a piston stroke wherein the maximum piston travel is some 9 to 10 inches shorter than the maximum length of stroke required for the "frame-lift" type of operation.

Normally, when initially considering the installation of the lift, one or the other types above indicated will be chosen. If subsequent operations reveal that the type of lift chosen is not the most desirable, the operator must acquire a new lift with the required maximum piston stroke; or, if the operations are such that both types of lifts are frequently necessary, then lifts of both types must be installed.

The principal object of this invention is to provide an improved lift for automotive vehicles, which can be readily and easily converted from one of the types of lift above indicated to the other type, resulting in greater versatility of use and economy of installation.

Another object of this invention is to provide a fluid-operated automotive vehicle lift wherein a plurality of different distances of maximum piston stroke can be selectively established, so that the vehicle to be lifted can be raised to any selected one of a plurality of predetermined distances above the ground level.

Briefly stated, this invention provides an automotive vehicle lift of the type having a superstructure adapted to engage beneath a vehicle to be raised above the ground level and a novel cylinder-and-piston assembly for raising and lowering said superstructure wherein the upward movement of the superstructure can be selectively limited to one of a plurality of predetermined distances above the ground level by selectively adjusting the maximum stroke of the piston.

Other objects and advantages will become apparent from a consideration of the following detailed description, taken in conjunction with the accompanying drawings wherein:

Fig. 1 is a plan view of a lift mechanism embodying the present invention;

Fig. 3 is a horizontal section taken substantially along line 3—3 of Fig. 2;

Fig. 5 is a horizontal section taken substantially along line 5—5 of Fig. 4.

Figures 2, 4:
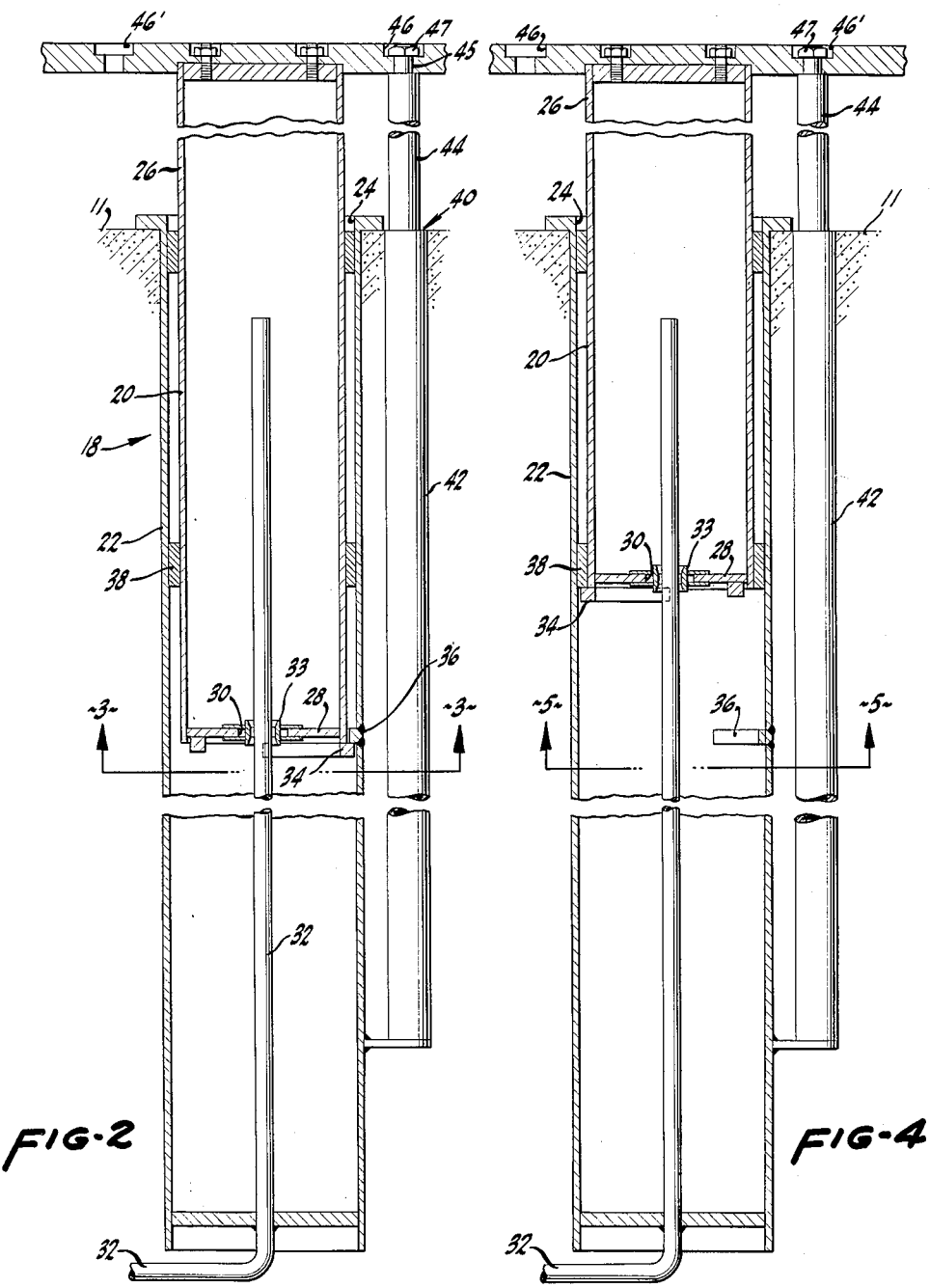
Fig. 2 is a vertical section taken along the line 2—2 of Fig. 1, showing the interior construction of the piston assembly with the piston in one position of maximum stroke.
Fig. 4 is a vertical section, generally similar to Fig. 2 but showing the piston in a second position of longer maximum stroke.

With continued reference to the drawings, there is shown a lift for automotive vehicles having a vehicle-lifting frame assembly or superstructure, generally indicated at 10 and shown to best advantage in Fig. 1. Superstructure 10 has a pair of parallel rails 12 and 14 carried centrally intermediate their ends by a cross member 16 extending between the rails and perpendicularly thereto.

The cross member 16 is secured to a piston assembly, generally indicated at 18, upon the closed upper end of a movable piston 20 of the assembly by a plurality of fastening means, such as the bolts and nuts shown in Fig. 1.

The cylinder assembly 18 of the lift includes a cylinder 22, usually buried in the ground or otherwise mounted below the level of the ground or floor represented by the horizontal line 11. The top 24 of the cylinder 22 opens through the floor level 11. Piston 20 is disposed within cylinder 22 for movement longitudinally of the cylinder through the open top 24 thereof, with the upper portion 26 of the piston adapted to project through the open top. The piston 20 is also rotatable within the cylinder 22 about its own longitudinal axis so that it can assume different positions of angular rotation, selectively, for a purpose which will presently appear.

The bottom wall 28 of the piston has an opening 30 therethrough to permit a fluid-carrying conduit 32 to enter the interior of the piston so that upon the application of fluid pressure by the admittance of fluid through the conduit 32, the piston will move longitudinally of the cylinder 22 through the open top thereof. It will be noted that the opening 30 is of larger diameter than the outside diameter of the conduit 32 and has an annular collar 33 secured concentrically therein and spaced from conduit 32 so that upon withdrawal of fluid the small circumferential space between the inner surface of the collar 33 and the outside diameter of the conduit will provide a restricted passageway whereby the piston can be slowly and gently lowered into the cylinder 22. For this purpose, the cylinder 22 is usually filled with oil or other viscous liquid. The fluid admitted and withdrawn through conduit 32 may be the same oil, or a different fluid such as air.

A ring segment 34 defining a stop engaging member, is fixedly secured to the bottom wall 28 of the piston 20 to extend peripherally thereabout and project peripherally therefrom, as shown in Figs. 2 and 4. The stop engaging member 34 is mounted to move in a rectilinear path longitudinally of the cylinder 22 with the piston, and also mounted to be rotatable with the piston.

A first stop member 36, in the form of a flange, is carried by the inner wall surface of the cylinder 22 and projects therefrom into the path of movement of the stop engaging member 34 so as to intersect the path of movement of the engaging member 34 as it moves with the piston 20. At the point of intersection, the upward movement of the piston stroke will be arrested by the abutting engagement of the member 34 with the first stop member 36 thereby establishing one position of maximum piston stroke.

A second stop member 38, which may be in the form of an annular, steel case of a sealing ring, as shown in Figs. 2 and 4, is carried by the inner surface of the cylinder 22, extending circumferentially thereabout and projecting inwardly toward the piston 20, in spaced longitudinal relation to the stop member 36.

Piston 20 can be rotated about its longitudinal axis to a selected position of angular rotation so that the stop engaging member 34 will no longer be intercepted by the stop member 36 as the piston moves upward, but will clear and move past the stop member 36 to be intercepted by the stop member 38 to establish a second position of maximum piston stroke. Thus, it will be seen that the maximum length of the piston stroke, in the latter case, will be longer by a distance between the stop members 36 and 38.

If the lift is to be used as a "drive-on" type, the superstructure will normally initially rest on the ground or floor surface, and the vehicle to be lifted will be driven over the normally beveled ends of the rails 12 and 14 until the entire vehicle is supported upon the rails. In the "drive-on" type of operation, the piston 20 has been rotated into one angular position where the stop engaging member 34 will be intersected by the first stop member 36 at the first established position of maximum piston stroke. This is the shorter of the selectively variable piston strokes.

If, however, it is decided to change the lift from the "drive-on" type of operation to the "frame-lift" type, it is merely necessary to rotate piston 20 to a second angular position about its axis wherein the stop engaging member 34 will clear the first stop member 36 and will be intersected in its path of movement by the second stop member 36 at the second established position of maximum piston stroke. In the "frame-lift" type of operation, the rails 12 and 14 of the superstructure are normally resting upon the floor or ground level, and the vehicle to be lifted is positioned above the rails with the wheels on the opposite sides of the vehicle outside of respective ones of the superstructure rails. Thus, it will be apparent that there must be some initial movement of the superstructure before the rails will engage the frame of the vehicle immediately thereabove. After engagement of the rails with the vehicle frame, the vehicle may then be raised to the desired height above the ground level. However, in order to raise the vehicle with the "frame-lift" type of operation to the same height as that to which the vehicle is raised by the "drive-on" type of operation, the maximum piston stroke must be longer by the distance the rails must travel before they engage with the vehicle frame. Therefore, the second definite length of maximum piston stroke, which has been established by the interengagement of the stop engaging member 34 with the second stop member 38, will be used for "frame-lift" operation.

When the lift mechanism is set to operate in either of the two modes, it is necessary that the piston 20 be kept from rotating about its longitudinal axis during operation of the lift. For this purpose there is provided the usual non-rotator, generally indicated at 40. The non-rotator comprises a rod 44 telescopically slidable into and out of a cylindrical tube 42 extending below the ground level 11 closely paralleling the cylinder 20. Tube 42 has its upper end opening through the ground level 11. The reduced, threaded, upper end 45 of the non-rotator rod 44 is received and secured within a socket 46 carried by the cross-member 16 of the superstructure, as by nut 47. Thus, as the piston 20 travels upwardly in response to hydraulic pressure, the rod 44 moves partially out of the tube 42. This will prevent rotation of the piston about its longitudinal axis because of the fixed connections between rod 44 and superstructure 10 and between superstructure 10 and piston 20. This arrangement will maintain both the superstructure and the piston in a fixed position of angular rotation about the axis of the piston.

From the foregoing it will be apparent that in order to convert the lift from one mode of operation to the other, it is necessary only to change the length of the maximum piston stroke, and perhaps to adjust the spacing between rails 12 and 14. The last-mentioned adjustment is not a part of the invention described and claimed in this patent application. To accomplish the change in stroke length, the non-rotator is disconnected from its socket in the superstructure, the superstructure and the piston are rotated together about the axis of the piston as from the position as shown in Fig. 2 to that shown in Fig. 4, or vice versa, which is approximately 180 degrees as shown, and the non-rotator is then reconnected in another alined socket 46' provided in the superstructure. The lift mechanism will then be operative in the selected one of the two modes. The shorter piston stroke shown in Fig. 2 will be used when "drive-on" operation is desired, and the longer piston stroke shown in Fig. 4 used for "frame-lift" operation.

It will be apparent that, if desired, the number of stop members employed can be increased to establish a corresponding increase in the number of positions of maximum piston stroke. Where the number of stop members is increased, they will be disposed in a staggered cirumferential relation to each other so that the piston 20 can be rotated to a selected angular position wherein the stop-engaging member or ring segment 34 will be engaged by a selected one of the plurality of stops. Also, where more than two stop members are to be employed, a corresponding increase in the number of non-rotator rod sockets will be provided the superstructure of the lift so that the rod will enter and be secure in a corresponding one of the sockets to insure against the rotation of the piston about its axis once the piston has been placed in the selected position of angular rotation.

Cross-member 16 of the superstructure preferably carries, adjacent to each of the sockets 46 and 46', markings indicating the length of the piston stroke which will result when the non-rotator rod 44 is attached into the respective sockets, whereby the operator can, without error, select the mode of operation desired. Of course, if the cylinder assembly is designed for more than two predetermined maximum stroke lengths, there will be a corresponding increase in the number of non-rotator receiving sockets and each of the additional sockets may be marked to indicate the maximum piston stroke resulting when the rod 44 is connected thereinto.

It should be understood that the invention is not limited to the specific example herein illustrated and described, and that its scope is defined by the following claims.

What is claimed is:

1. In a vehicle lift having a superstructure adapted to engage beneath a vehicle to be raised above a ground level, a fluid-operated cylinder-and-piston assembly operatively connected to said superstructure for raising said superstructure to a selected one of a plurality of predetermined distances above the ground level, which distances are ultimately determined by the rotational position of said lift, said assembly comprising a cylinder open at one end, a piston disposed within said cylinder for movement longitudinally thereof through said open end, and means carried by said piston and said cylinder for varying, selectively, the piston stroke to one of a plurality of predetermined maximum positions, whereby said superstructure will be raised to a selectively predetermined distance above the ground level, wherein said varying means includes an outwardly projecting stop engaging member carried by said piston for movement therewith, and peripherally and vertically spaced stop members carried by said cylinder projecting into the path of movement of said stop engaging member to intersect said stop engaging member at different locations along the longitudinal extent of the cylinder to define alternative positions of maximum stroke for said piston.

2. In a vehicle lift having a superstructure adapted to engage beneath a vehicle to be raised above the ground level, a fluid-operated cylinder-and-piston assembly operatively connected to said superstructure for raising said superstructure to a selected one of a plurality of predetermined distances above the ground level, said assembly comprising an upstanding cylinder having an open top, a piston disposed within said cylinder for movement longitudinally thereof through said open end and for rotation about its own axis to a plurality of selected positions of angular rotation, and means carried by said piston and said cylinder for varying the maximum length of the stroke of said piston to a plurality of predetermined positions whereby said superstructure will be raised to a predetermined distance above the ground level corresponding to the selected maximum stroke position of the piston, said means comprising a stop-engaging member carried by said piston for longitudinal and rotational movement therewith and extending outwardly therefrom, and a plurality of longitudinally spaced stop members carried by said cylinder to project inwardly therefrom and arranged in staggered circumferential relation, one of said stop members intersecting the path of movement of said stop engaging members alternatively when said piston is rotated to one selected angular position to define a position of maximum piston stroke.

3. In a vehicle lift having a superstructure adapted to engage beneath a vehicle to be raised above a ground level, a fluid-operated cylinder-and-piston assembly operatively connected to said superstructure for raising said superstructure to a selected one of a plurality of predetermined distances above the ground level, said assembly comprising an upstanding cylinder having an open top, a piston disposed within said cylinder for movement longitudinally thereof through said open end and for rotation about its own axis to a plurality of selected positions of angular rotation, and means carried by said piston and said cylinder for varying the maximum length of the stroke of said piston to a plurality of predetermined positions whereby said superstructure will be raised to a predetermined distance above the ground level corresponding to the selected maximum stroke position of the piston, said means comprising a stop-engaging member carried by said piston for movement therewith and projecting outwardly therefrom, a first stop member and a second stop member carried by said cylinder projecting inwardly therefrom and arranged in longitudinally spaced relation, said first member intersecting the path of movement of said stop engaging member as said piston moves longitudinally of said cylinder in one angular position of rotation to define one position of maximum piston stroke, and said second stop member intersecting the path of movement of said stop engaging member to define a different position of maximum piston stroke when said piston is rotated to another selected angular position.

4. The lift as in claim 2 wherein there is provided means detachably engageable with said superstructure for maintaining said piston in the selected position of angular rotation.

5. The lift as in claim 3 wherein said stop-engaging member is a ring segment fixedly secured to one end of the piston within said cylinder extending peripherally thereabout and projecting outwardly therefrom.

6. An adjustable-stroke cylinder-and-piston assembly for an automotive vehicle lift, comprising a cylinder open at one end, a piston whose maximum stroke is varied from one position to other positions disposed in said cylinder for movement longitudinally thereof to selected positions of maximum stroke and rotatable about its longitudinal axis within said cylinder to selected angular positions, interengaging means carried by said cylinder and said piston for selectively establishing positions of maximum piston stroke with said piston in selected positions of angular rotation, said interengaging means including a stop-engaging member carried by said piston for longitudinal and rotational movement therewith and projecting outwardly therefrom, and a plurality of stop means carried by said cylinder at spaced longitudinal intervals therealong and arranged in staggered circumferential relation, one of said stop means intersecting the path of movement of said stop-engaging member, with said piston in one of its selected positions of angular rotation to establish one position of maximum piston stroke.

7. The cylinder assembly as in claim 6 wherein there is provided means operatively connected to said piston for maintaining it in the selected one position of angular rotation.

8. In a vehicle lift having a superstructure adapted to engage beneath a vehicle to be raised above a ground level, a fluid-operated cylinder-and-piston assembly operatively connected to said superstructure for raising said superstructure to a selected one of a plurality of predetermined distances above the ground level, which distances are ultimately determined by the rotational position of said lift, said assembly comprising a cylinder element open at one end, a piston element slidably and rotatably mounted in the cylinder element, interengaging means carried by said piston and cylinder elements for selectively limiting the upward travel of the piston element in the cylinder element to a plurality of vertically spaced positions, said interengaging means including a stop member carried by one of said elements and a plurality of vertically and circumferentially spaced stop members carried by the other of said elements, said stop members in one vertically aligned position limiting the upward travel of the piston element to a first position and in another angularly spaced, vertically aligned, position limiting the upward travel of said piston element to a second position which is above said first position.

UNITED STATES PATENTS

References Cited in the file of this patent

| | | |
|---|---|---|
| 1,965,751 | Rush | July 10, 1934 |
| 2,736,294 | Buehner | Feb. 28, 1956 |
| 2,757,903 | Bill | Aug. 7, 1956 |

FOREIGN PATENTS

| | | |
|---|---|---|
| 142,537 | Switzerland | Sept. 30, 1930 |